(12) United States Patent
Komiyama et al.

(10) Patent No.: US 10,527,814 B2
(45) Date of Patent: Jan. 7, 2020

(54) LENS UNIT AND MANUFACTURING METHOD FOR LENS UNIT

(71) Applicant: NIDEC SANKYO CORPORATION, Nagano (JP)

(72) Inventors: Tadashi Komiyama, Nagano (JP); Tsuyoshi Hiraga, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 12 days.

(21) Appl. No.: 15/716,526

(22) Filed: Sep. 27, 2017

(65) Prior Publication Data
US 2018/0088297 A1 Mar. 29, 2018

(30) Foreign Application Priority Data

Sep. 29, 2016 (JP) ................... 2016-191522

(51) Int. Cl.
*G02B 7/02* (2006.01)
*G02B 7/04* (2006.01)
*G02B 27/00* (2006.01)

(52) U.S. Cl.
CPC ............. *G02B 7/021* (2013.01); *G02B 7/04* (2013.01); *G02B 27/0025* (2013.01)

(58) Field of Classification Search
CPC .......... G02B 7/021; G02B 7/023; G02B 7/04; G02B 13/0055; G02B 27/0025
USPC ......................................................... 359/754
See application file for complete search history.

(56) References Cited

U.S. PATENT DOCUMENTS

2010/0254027 A1\* 10/2010 Genda ................ G02B 13/0035
359/738

FOREIGN PATENT DOCUMENTS

| CN | 1396473 | 2/2003 |
| CN | 103885098 | 6/2014 |
| JP | 2014170123 | 9/2014 |
| JP | 2015175918 | 10/2015 |
| JP | 2015175918 A | * 10/2015 |

OTHER PUBLICATIONS

"Search Report of Europe Counterpart Application", dated Feb. 13, 2018, p. 1-p. 6.
"Office Action of China Counterpart Application," with English translation thereof, dated Sep. 4, 2019, p. 1-p. 15.

\* cited by examiner

*Primary Examiner* — James R Greece
(74) *Attorney, Agent, or Firm* — JCIPRNET

(57) ABSTRACT

A lens unit with multiple lenses includes at least a glass lens arranged in an optical axis direction and a lens barrel holding the lenses. The lens barrel includes a lens holder holding the glass lens. An object side face of the lens holder is formed with multiple projecting parts supporting an adjacent lens which is adjacent to the glass lens on the object side. The projecting parts is structured as a distance determination part adjusting and determining a space distance between the glass lens and the adjacent lens by using a heat press process. A crushing amount of the projecting parts is determined with a lens face of the glass lens as a reference. The space distance between the glass lens and the adjacent lens is adjusted to restrain focus deviation due to a thickness error of the glass lens occurred at the time of molding the glass lens.

20 Claims, 3 Drawing Sheets

LENS UNIT AND MANUFACTURING METHOD FOR LENS UNIT

CROSS REFERENCE TO RELATED APPLICATION

The present invention claims priority under 35 U.S.C. § 119 to Japanese Application No. 2016-191522 filed on Sep. 29, 2016, the entire content of which is incorporated herein by reference.

FIELD OF THE INVENTION

The present invention relates to a lens unit and a manufacturing method for the lens unit. More specifically, the present invention relates to a lens unit comprising a structure for adjusting a distance between a glass lens and another lens adjacent to the glass lens, and relates to a manufacturing method for the lens unit.

BACKGROUND

In Japanese Patent Laid-Open No. 2014-170123, a lens unit is disclosed which is provided with a structure for restraining distortion of a glass lens which is held on a lens frame by press fitting. In the lens unit described in this Patent Literature, an excessive pressure is restrained from being applied to the glass lens, the lens frame and a holder at the time of press fitting and thereby distortion of the glass lens held by the lens frame due to press fitting is suppressed.

In Japanese Patent Laid-Open No. 2015-175918, a wide angle lens unit is disclosed which is provided with a structure for aligning by utilizing a glass lens which is held by a lens holder. In the wide angle lens unit described in this Patent Literature, a position of a first holder is adjusted by an aligning pin inserted through an opening part for alignment and then the first holder is fixed to a second holder and, in this manner, alignment is performed by utilizing a glass lens held by the lens holder.

With requirements for optical performance of the entire lens unit become strict, molding accuracy for each of lenses has been required to improve. A plastic lens is capable of suppressing cost lower than a glass lens, but a variation of its refractive index with respect to a temperature change is large. Therefore, in order to improve temperature characteristics of the lens unit, it is preferable to utilize a glass lens. However, especially, although a glass lens produced by being polished with a grindstone or the like is capable of suppressing a surface accuracy error of its lens face but the glass lens is difficult to attain a high degree of molding accuracy. For example, an error of about several tens of μm is occurred in molding accuracy in lens thickness of a glass lens in comparison with molding accuracy in thickness of a plastic lens which is suppressed to an error of about several μm. Therefore, it is difficult to attain required optical performances, especially, to suppress a cause of focus deviation.

In the former Patent Literature (Japanese Patent Laid-Open No. 2014-170123), a structure is disclosed that, in a case that a glass lens is press-fitted to an inner side of a lens frame and the lens frame is press-fitted to an inner side of a holder, an excessive pressure is restrained from being applied to the glass lens, the lens frame and the holder at the time of press-fitting and, when temperature change is occurred, concentration of stress to specific portions of the glass lens, the lens frame and the holder is relaxed. In this case, in the lens holding part to which the glass lens is press-fitted, a tip end face (face on the object side), which is perpendicular to an optical axis, of an object side glass lens insertion part of the lens holding part is abutted with an adjacent lens on the object side. Further, in the lens holding part to which the glass lens is press-fitted, a protruded part extended in a circumferential direction on an outer peripheral side of an end face of an image side glass lens insertion part of the lens holding part is abutted with an adjacent lens on the image side. Alternatively, a plurality of protruded parts (faces on the image side) separated from each other in the circumferential direction are abutted with an adjacent lens on the image side. However, the structure in the former Patent Literature is provided with no adjusting structure for adjusting a space in the optical axis direction between the glass lens and a lens adjacent to the glass lens. Therefore, the space in the optical axis direction between the glass lens and the adjacent lens cannot be adjusted.

In the latter Patent Literature (Japanese Patent Laid-Open No. 2015-175918), a structure is disclosed that a position of a first holder by which a glass lens is held is adjusted by a centering pin inserted into a centering opening part formed in a second holder which holds the first holder on its inner side. Centering is performed so that the position of the glass lens is adjusted in a direction perpendicular to the optical axis. However, the structure in the latter Patent Literature is provided with no adjusting structure for adjusting a space in the optical axis direction between the glass lens and a lens adjacent to the glass lens. Therefore, the space in the optical axis direction between the glass lens and the adjacent lens cannot be adjusted.

Accordingly, in a lens unit into which the glass lens is assembled, a structure is required which is capable of restraining trouble such as focus deviation caused by a molding error of the glass lens.

SUMMARY

In view of the problem described above, the present invention provides a lens unit including a plurality of lenses which includes a glass lens and a lens barrel which holds the plurality of lenses. In the lens unit, a distance between the glass lens and another lens adjacent to the glass lens is adjusted to restrain trouble such as focus deviation due to a molding error or the like of the glass lens. Further, the present invention provides a manufacturing method for a lens unit which restrains trouble such as focus deviation due to a thickness error or the like occurred at the time of molding the glass lens.

In order to solve the above-mentioned problem, the present invention provides a lens unit including a plurality of lenses arranged in an optical axis direction and a lens barrel which holds the plurality of lenses. The plurality of lenses includes at least a glass lens and the lens barrel includes a glass lens holding part which holds the glass lens. When a face of the glass lens holding part which is on an object side in the optical axis direction is referred to as an object side face and another face of the glass lens holding part which is on an image side is referred to as an image side face, the object side face or the image side face is formed with a plurality of projecting parts which support an adjacent lens which is adjacent to the glass lens on one side, and the plurality of projecting parts is structured as a distance determination part which adjusts and determines a space distance between the glass lens and the adjacent lens.

In the present invention, the glass lens holding part which holds the glass lens is provided with a plurality of projecting parts and thus a space distance between the glass lens and an adjacent lens can be adjusted by adjusting a length of the plurality of projecting parts. Therefore, trouble such as focus deviation due to a thickness error or the like of the glass lens occurred at the time of molding the glass lens can be restrained.

It is preferable that the glass lens holding part is a lens holder made of resin which is separately provided from the lens barrel and is accommodated into the lens barrel together with the glass lens.

After the glass lens has been assembled to the glass lens holding part, the glass lens is accommodated into the lens barrel. Therefore, the glass lens can be assembled into the lens barrel in a state that variation of an assembling dimension error is restrained. Further, since the lens holder is made of resin and thus molding is easily performed and, in addition, the stress and the like applied to the glass lens can be absorbed by the resin. Therefore, damage, deformation, distortion and the like of the glass lens can be suppressed.

Further, it is preferable that the object side face or the image side face of the lens holder is formed with a plurality of groove parts each of which is continuously formed from an outer peripheral face of the lens holder to an outer peripheral face of the glass lens, and the groove parts are formed at equal intervals along a circumferential direction of the lens holder.

The groove part is continuously formed from an outer peripheral face of the lens holder to an outer peripheral face of the glass lens. Therefore, when a positional adjustment of the glass lens disposed in the lens holder is to be performed on the lens holder in a direction perpendicular to the optical axis, a jig for positional adjustment is disposed in the groove part and the positional adjustment can be performed. Further, the groove part is formed at plural positions at equal intervals along a circumferential direction of the lens holder and thus shrinkage of the lens holder at the time of molding can be restrained and occurrence of distortion can be suppressed.

Further, it is preferable that a face of the lens holder on an opposite side to a face where the projecting parts are formed is formed with a gate part which is a recessed part in which an injection-molded gate mark is left, and the plurality of projecting parts and the gate part are disposed at different positions in a circumferential direction of the lens holder.

Since a gate mark is disposed in the gate part, a burr formed in the gate mark at the time of injection molding is formed in the gate part and thus the burr and the like are not protruded from the other face of the object side face and the image side face of the lens holder. Therefore, positional displacement at the time of assembling of the lens holder to the lens barrel does not occur. Further, in a case that the plurality of projecting parts and the gate part are disposed at an overlapped position in the circumferential direction of the lens holder, when a length of the plurality of projecting parts is to be adjusted, the recessed part may be deformed and resiliently bent and thus there may be occurred that an intended adjustment cannot be attained. However, when the plurality of projecting parts and the gate part are disposed at different positions from each other in the circumferential direction of the lens holder, adjustment with a high degree of accuracy can be performed.

Further, it is preferable that the distance determination part which is the projecting part is formed so that a tip end part of the projecting part is heated and crushed to adjust a length of the projecting part in the optical axis direction, and a space is provided between forming positions of the projecting parts and an outer peripheral face of the lens holder in a radial direction of the lens holder for preventing a crushed and protruded portion of the tip end part from contacting with an inner face of the lens barrel. Specifically, the distance determination part adjusts the space distance between the glass lens and the adjacent lens so as to restrain focus deviation based on a thickness error of the glass lens. In this case, it may be structured that a face of the lens holder on an opposite side to a face where that the projecting parts are formed is a reference surface structured to measure a height of a lens surface apex of the glass lens which is fixed to the lens holder, and a height of the distance determination part from the reference surface is determined based on the height of the lens surface apex from the reference surface.

For example, in a case that a length in the optical axis direction of the projecting part is adjusted by a heat press, even when a burr or the like is occurred by crushing the projecting part, the projecting part is provided on an inner side in a radial direction of an outer peripheral face of the lens holder and thus the burr or the like is not contacted with an inner face of the lens barrel and the lens holder can be assembled into the lens barrel.

Further, it is preferable that the lens unit further includes a diaphragm which is accommodated in the lens barrel, and the glass lens is disposed at a position adjacent to the diaphragm.

In the lens unit comprised of a plurality of lenses, the most effective arrangement of a glass lens is that one of two lenses sandwiching a diaphragm is a glass lens. A lens in the vicinity of the diaphragm is easily affected by temperature change and thus a lens having a high optical characteristic capable of restraining an aberration is required. A variation of a refractive index of a plastic lens in temperature is large. However, in a case of a glass lens, a variation of its refractive index can be suppressed to about one-tenth of that of a plastic lens. Therefore, when a glass lens among a plurality of lenses is disposed at a position adjacent to a diaphragm, a lens unit can be manufactured in which displacement of the focus position due to temperature change is hard to be occurred.

Further, it is preferable that the lens holder further includes a pawl part which is a rib made of resin structured to fix the glass lens by thermal caulking.

The pawl part is a rib made of resin and thus the rib is deformed by thermal caulking and the glass lens is fixed to the lens holder.

Further, it is preferable that the object side face of the lens holder is formed with a protruded part or a recessed part which is a mark used to set the lens holder in an appropriate posture with respect to the lens barrel.

When the lens holder is to be assembled into the lens barrel, the protruded part or the recessed part of the lens holder can be confirmed as a mark. Therefore, assembling of the glass lens to the lens holder and assembling of the lens holder to the lens barrel can be surely performed with a high degree of positional accuracy in a circumferential direction without mistaking the assembling direction.

Further, it is preferable that the plurality of projecting parts is formed on the object side face of the lens holder.

The plurality of projecting parts is formed on the object side face and thus a space distance between the glass lens and the adjacent lens can be adjusted.

Further, in order to solve the above-mentioned problem, the present invention provides a manufacturing method for a lens unit, the lens unit including a plurality of lenses which are arranged in an optical axis direction and a lens barrel which holds the plurality of lenses. The plurality of lenses includes at least a glass lens and the lens barrel includes a glass lens holding part which holds the glass lens and, when a face of the glass lens holding part which is on an object side in the optical axis direction is referred to as an object side face and another face of the glass lens holding part which is on an image side is referred to as an image side face, the object side face or the image side face is formed with a plurality of projecting parts which support an adjacent lens which is adjacent to the glass lens on one side. The plurality of projecting parts is structured as a distance determination part which adjusts and determines a space distance between the glass lens and the adjacent lens. The manufacturing method includes a heat press process in which tip end parts of the plurality of projecting parts are heated and crushed so that a length in the optical axis direction of the plurality of projecting parts is adjusted and thereby a length of the distance determination part is determined.

The manufacturing method includes a heat press process in which tip end parts of the plurality of projecting parts are heated and crushed so that a length in the optical axis direction of the plurality of projecting parts is adjusted and thereby a space distance between one side face of the glass lens and the other side face of the adjacent lens can be adjusted. Therefore, the lens unit can be manufactured in which trouble such as focus deviation due to a thickness error or the like of the glass lens occurred at the time of molding can be restrained.

Further, it is preferable that the glass lens holding part is a lens holder made of resin which is separately provided from the lens barrel and is accommodated into the lens barrel together with the glass lens, and the heat press process is performed before the lens holder is accommodated into the lens barrel.

The manufacturing method includes a heat press process in which tip end parts of the plurality of projecting parts of the glass lens holding part are heated and crushed and, after the glass lens has been assembled to the glass lens holding part, the glass lens holding part is accommodated into the lens barrel. Further, since the lens holder is made of resin and thus molding is easily performed and, in addition, the stress and the like applied to the glass lens by the heat press process can be absorbed by the resin. Therefore, damage, deformation, distortion and the like of the glass lens can be suppressed. Further, the plurality of projecting parts are made of resin and thus the tip end parts can be deformed and crushed by the heat press process.

Further, it is preferable that, in the heat press process, a crushing amount of the plurality of projecting parts is determined with a lens face of the glass lens as a reference. Specifically, a face of the lens holder on an opposite side to the face where the projecting parts are formed is a reference surface structured to set the length in the optical axis direction of the projecting part as the distance determination part, a height of a lens surface apex of the glass lens is measured from the reference surface when the glass lens is mounted on a glass lens mounting part of the lens holder and, after that, a crushing amount of the tip end part of the projecting part which is heated and crushed is determined based on the height of the lens surface apex from the reference surface, and then the heat press process is performed. In this case, it may be manufactured that the glass lens is mounted on the glass lens mounting part of the lens holder and then the heat press process is performed and, after that, the lens holder is accommodated into the lens barrel and then, the adjacent lens is accommodated into the lens barrel.

A glass lens produced by being polished with a grindstone or the like is capable of suppressing an error of a lens face. However, an error of lens thickness of the glass lens is difficult to suppress and it is difficult to attain a high degree of molding accuracy in thickness in comparison with molding accuracy in thickness of a plastic lens. According to this manufacturing method, a crushing amount of the respective projecting parts is determined with a lens face of the glass lens as a reference and thus, an appropriate crushing amount of the respective projecting parts can be adjusted with respect to the lens face of the glass lens without considering an error of thickness of the glass lens. Therefore, trouble such as focus deviation due to a thickness error or the like of the glass lens occurred at the time of molding can be further restrained.

Further, it is preferable that the lens holder includes a pawl part which is a rib made of resin structured to fix the glass lens by thermal caulking and, in the heat press process, adjustment of the length in the optical axis direction of the plurality of projecting parts and the thermal caulking of the pawl part are performed simultaneously.

In the heat press process, adjustment of the length in the optical axis direction of the plurality of projecting parts and the thermal caulking of the pawl part are performed simultaneously. Therefore, fixing of the glass lens to the glass lens holding part and adjustment of a space distance between the glass lens and the adjacent lens which is adjacent to a face where the plurality of projecting parts of the glass lens holding part is formed can be performed simultaneously. Further, in comparison with a heat press process in which adjustment of a length in the optical axis direction of the plurality of projecting parts and thermal caulking of the pawl parts are separately performed, the number of the processes can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a lens unit in accordance with the present invention will be described in detail below with reference to the accompanying drawings. A lens unit 1 in accordance with this embodiment is a lens assembly which includes a wide angle lens and is incorporated into an on-vehicle periphery monitoring camera, a monitoring camera, an intercom and the like. An "object side" and an "image side" in this specification of the present invention are an object side and an image side in an optical axis "L" direction in FIGS. 1 through 3, and an "optical axis direction" is a direction parallel to the optical axis "L".

(Entire Structure)

Figure 1:
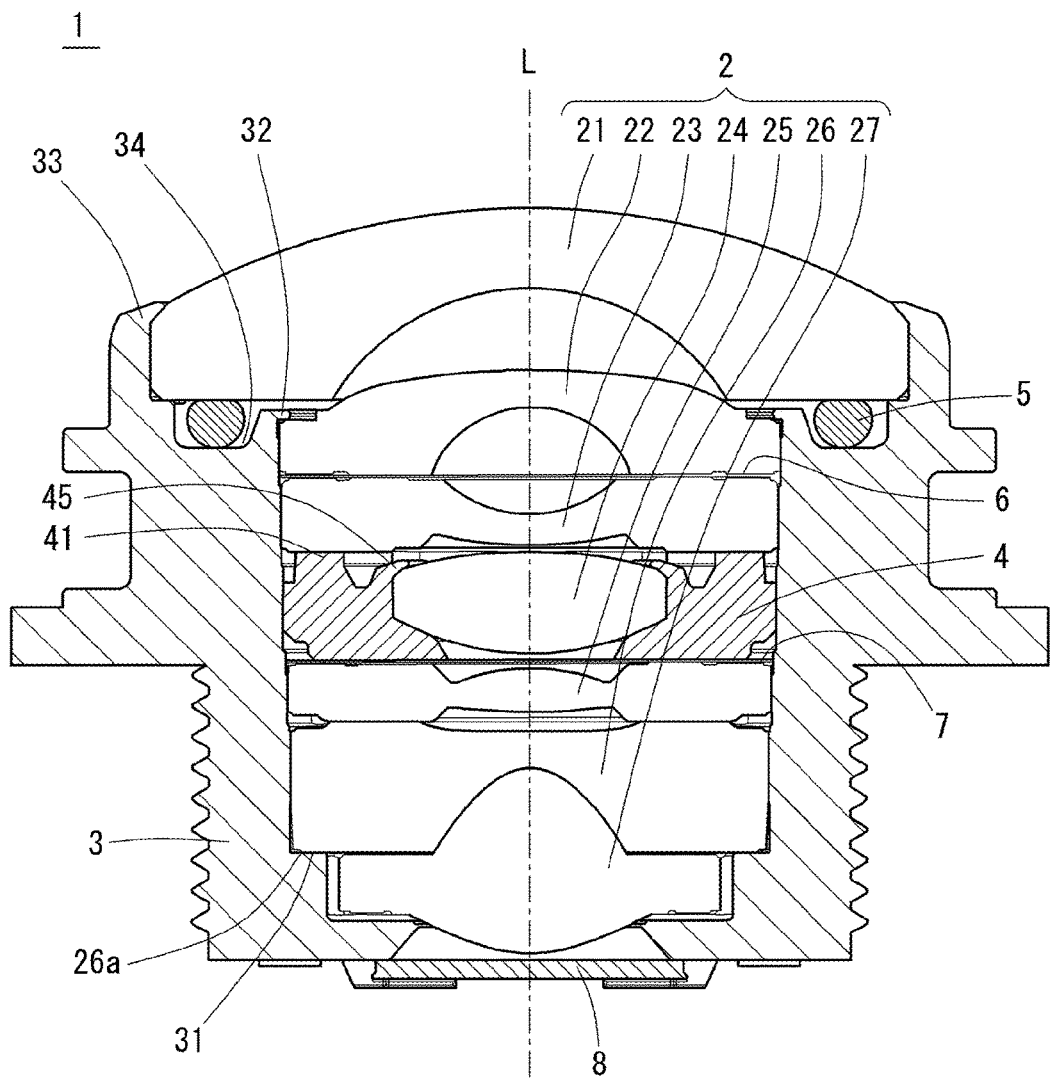
FIG. 1 is an explanatory view showing the entire structure of a lens unit 1.

In this embodiment, a lens unit 1 is, as shown in FIG. 1, structured of a wide angle lens 2 constituted of seven lenses, i.e., a first lens 21, a second lens 22, a third lens 23, a fourth lens 24, a fifth lens 25, a sixth lens 26 and a seventh lens 27 which are disposed along an optical axis "L", a lens holder 4 which is a glass lens holding part holding the fourth lens 24 that is a glass lens, an O-ring 5 which is a circular ring-shaped sealing member made of rubber, a light shielding sheet 6, a diaphragm 7, an optical filter 8, and a lens barrel 3 which holds these members.

In the lenses constituting the wide angle lens 2, the first lens 21 is a lens disposed on the most object side. The second lens 22 is a lens located on the image side of the first lens 21, and the third lens 23 is a lens located on the image side of the second lens 22. The fourth lens 24 is a lens located on the image side of the third lens 23 and is fixed by pawl parts 45 formed in the lens holder 4. The fifth lens 25 is a lens located on the image side of the fourth lens 24. The sixth lens 26 is a lens located on the image side of the fifth lens 25 and the seventh lens 27 is a lens located on the image side of the sixth lens 26. The sixth lens 26 and the seventh lens 27 are a cemented lens.

The light shielding sheet 6 is disposed between the second lens 22 and the third lens 23, and the diaphragm 7 is disposed between the fourth lens 24 and the fifth lens 25. The second lens 22, the third lens 23, the lens holder 4, the fifth lens 25, the sixth lens 26, the seventh lens 27, the light shielding sheet 6 and the diaphragm 7 are disposed so as to be closely contacted with each other in the optical axis "L" direction.

The first lens 21 is a glass lens. A glass lens is also used as the fourth lens 24 from the viewpoints that a surface accuracy of a lens and optical characteristics such as a refractive index to temperature change are superior. Further, a plastic lens is used as the second lens 22, the third lens 23, the fifth lens 25, the sixth lens 26 and the seventh lens 27 from the viewpoints that workability of a lens and economical efficiency are superior.

In this embodiment, the lens holder 4 to which the fourth lens 24, i.e., a glass lens is fixed is made of polycarbonate resin. The lens holder 4 is formed with a boss part 41 which is a projecting part projecting to the object side (one side) from an object side face (face on the one side) of the lens holder 4 at six positions. Each of the six boss parts 41 is capable of adjusting its length in the optical axis "L" direction and is used as a distance determination part which is capable of determining a space distance between the fourth lens 24 and the third lens 23 to an appropriate distance based on a thickness in the optical axis "L" direction of the fourth lens 24 comprised of a glass lens. In this embodiment, the third lens 23 is referred to as an adjacent lens which is adjacent to the fourth lens 24 on the object side (one side) with respect to the boss parts 41. Tip end parts 41a of the six boss parts 41 as the distance determination parts are abutted with an image side face (the other side face) of the third lens 23 to determine the space distance between the fourth lens 24 and the third lens 23. Further, the lens holder 4 is formed with the pawl parts 45 on its object side face. The pawl parts 45 are used for fixing the fourth lens 24 to the lens holder 4 by caulking.

The wide angle lens 2 is an inverted telescopic type (so-called retrofocus type) single focus wide angle lens which is constituted of six groups having seven pieces, i.e., the first lens 21, the second lens 22, the third lens 23 and the sixth lens 26 having negative powers, and the fourth lens 24, the fifth lens 25 and the seventh lens 27 having positive powers. The wide angle lens 2 of the lens unit 1 in this embodiment is constituted of the seven lenses. However, the number of the lenses is not limited to this embodiment and it may be constituted of no cemented lens. Further, in this embodiment, the glass lens is used as the fourth lens 24 which is adjacent to the diaphragm 7 on the object side. However, it may be structured that the fourth lens 24 adjacent to the diaphragm 7 on the object side is a plastic lens and the fifth lens 25 adjacent to the diaphragm 7 on the image side is a glass lens and is mounted on the lens holder 4. Further, although the first lens 21 is a glass lens, a plastic lens may be used as the first lens 21.

The lens barrel 3 is a cylindrical tube shaped lens frame made of resin and is provided with an inner peripheral face toward the image side along outer peripheral faces of the respective lenses constituting the wide angle lens 2. The respective outer peripheral faces of the first lens 21, the second lens 22, the third lens 23, the lens holder 4, the fifth lens 25 and the sixth lens 26 constituting the wide angle lens 2 are supported by the inner peripheral face of the lens barrel 3 and they are positioned in a direction perpendicular to the optical axis "L" direction. Further, a flat face part 26a formed on a periphery of the image side face of the sixth lens 26 is placed on a ring-shaped flat face part 31 extended to an inner side in a circumferential direction on the image side of the lens barrel 3, and a periphery of an object side face of the second lens 22 is locked by a caulking part 32 provided at an end part of an object side inner peripheral face of the lens barrel 3. As a result, the second lens 22, the third lens 23, the lens holder 4, the fifth lens 25, the sixth lens 26 and the seventh lens 27 are positioned in the optical axis "L" direction. Further, after the O-ring 5 is placed on a ring-shaped groove part 34 formed on an object side face of the lens barrel 3, the first lens 21 is placed on the O-ring 5 and a periphery of the first lens 21 is locked by a caulking part 33 provided at an object side end part of the lens barrel 3 and thereby the first lens 21 is positioned in the optical axis "L" direction.

(Lens Holder Structure)

Figure 2A:
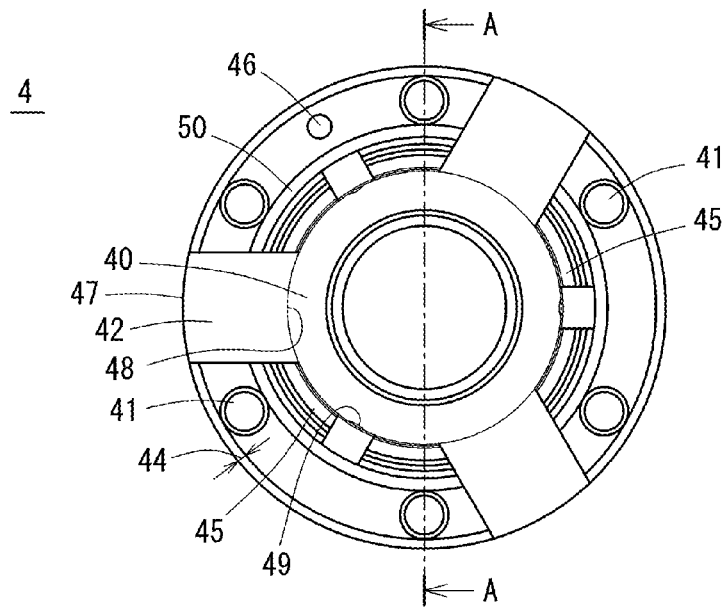
FIG. 2A is a front view showing a structure of a lens holder 4.
Figure 2B:
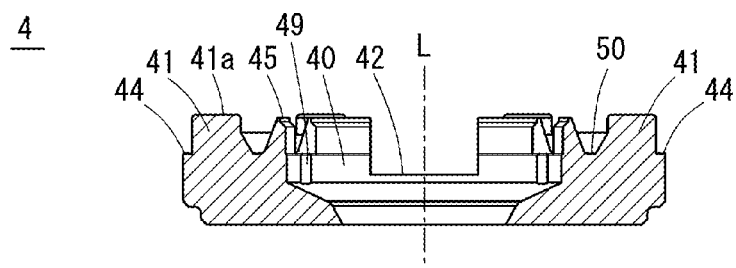
FIG. 2B is the "A-A" cross-sectional view showing the lens holder 4 in FIG. 2A.
Figure 2C:
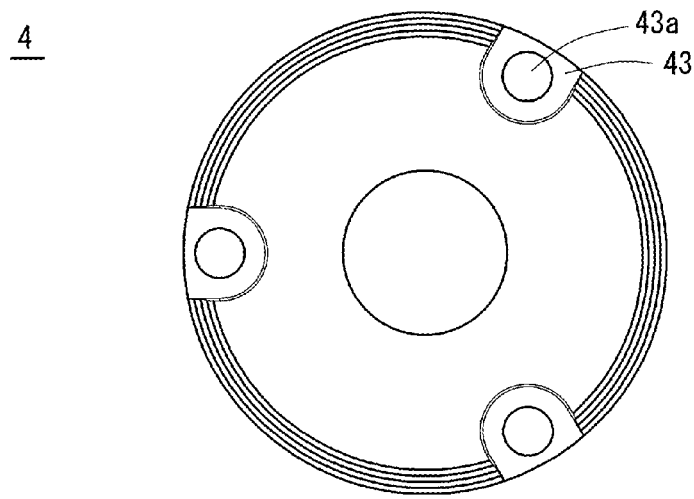
FIG. 2C is a rear view showing the structure of the lens holder 4.

As shown in FIGS. 2A through 2C, the lens holder 4 is formed in a substantially cylindrical tube shape made of resin and is formed with a glass lens mounting part 40 and the six boss parts 41 on an object side face which faces the optical axis "L" direction. The glass lens mounting part 40 is mounted with the fourth lens 24 at its center portion. Further, the six boss parts 41 are provided on an outer peripheral side with respect to the glass lens mounting part 40. A length of the boss part 41 in the optical axis "L" direction is adjusted by heating and crushing its tip end part 41a. Therefore, a length in the optical axis "L" direction of the boss part 41 is previously set longer than a length which is assumed as the distance determination part, and the tip end part 41a having the longer length is heated and crushed to set in an appropriate length in the optical axis "L" direction. In accordance with an embodiment of the present invention, the number of the boss parts 41 is not limited to six (6), and it may be structured that the boss parts 41 are formed at equal intervals in the circumferential direction of the lens holder 4. Further, in this embodiment, the boss part 41 is formed so as to protrude to the object side from the object side face of the lens holder 4. However, it may be structured that the boss part 41 is formed so as to protrude to the image side from the image side face of the lens holder 4.

The object side face of the lens holder 4 is formed with a groove part 42 which is continuously formed from an outer peripheral face 47 of the lens holder 4 to an inner side toward the glass lens mounting part 40. The groove part 42 is formed at three positions at equal intervals in the circumferential direction of the lens holder 4. The groove part 42 is formed so as to be continuously connected with the outer peripheral face of the fourth lens 24 when the fourth lens 24 is mounted on the lens holder 4. Further, a depth of the groove part 42 is formed so that an upper part of the outer peripheral face of the fourth lens 24 is exposed. Preferably, a half or more width in the optical axis "L" direction of the outer peripheral face of the fourth lens is exposed through the groove part 42. Therefore, when a position of the fourth lens 24 disposed on the lens holder 4 is to be adjusted with respect to the lens holder 4 in a direction perpendicular to the optical axis "L", a jig for positioning can be disposed in the groove parts 42 and thus the positioning is easily performed. In other words, the groove part 42 may be referred to as an adjusting groove which is formed for adjusting a position of the fourth lens 24 in a direction perpendicular to the optical axis "L". In accordance with an embodiment of the present invention, the number of the groove parts 42 is not limited to three (3). The groove parts 42 may be formed at equal intervals in the circumferential direction of the lens holder 4. As described above, when the groove parts 42 are provided so as to be formed at equal intervals in the circumferential direction, recessed parts which are recessed in the optical axis "L" direction are formed in the lens holder 4 at equal intervals and thus, in a case that the lens holder 4 is formed of resin, occurrence of shrinkage can be suppressed.

An opposite side face to the face where the six boss parts 41 are formed, in other words, an image side face which is the other side face of the lens holder 4 is formed as a reference surface which is a reference when a length in the optical axis "L" direction of each of the boss parts 41 is to be set to a length as the distance determination part. The image side face of the lens holder 4 is formed at three positions with a gate part 43 which is a recessed part where a gate mark 43a for injection-molding is left. In other words, the gate part 43 is formed as a recessed part which is recessed from the reference surface. Therefore, a burr occurred in the gate mark 43a at the time of injection molding is formed in the gate part 43. Accordingly, the burr is not protruded from the image side face (the reference surface) of the lens holder 4 and positional displacement does not occur at the time of assembling of the lens holder 4. As a result, a height of the boss part 41 can be adjusted with the image side face of the lens holder 4 as the reference surface and the boss part 41 can be used as the distance determination part. Further, the boss part 41 and the gate part 43 are disposed at different positions from each other in the circumferential direction of the lens holder 4. In a case that the boss part 41 and the gate part 43 are disposed at an overlapped position in the circumferential direction of the lens holder 4, when a length of the boss part 41 is to be adjusted, the gate part 43 may be deformed and resiliently bent and thus there may be occurred that an intended adjustment cannot be attained. However, in this embodiment, the boss part 41 and the gate part 43 are disposed at different positions from each other in the circumferential direction of the lens holder 4 and thus the adjustment of the boss part 41 can be performed with a high degree of accuracy. In accordance with an embodiment of the present invention, the number of the gate parts 43 is not limited to three (3). The gate parts 43 may be formed at equal intervals in the circumferential direction of the lens holder 4.

The six boss parts 41 are provided on an inner side in a radial direction with respect to the outer peripheral face 47 of the lens holder 4. In other words, a space 44 is provided in the radial direction between the six boss parts 41 and the outer peripheral face 47 of the lens holder 4. The space 44 is provided so that burrs or crushed and extruded portions of the tip end parts 41a which are extruded when the tip end parts 41a of the six boss parts 41 are crushed are prevented from being extruded to an outer side from the outer peripheral face 47. The burr or the crushed and extruded portion of the tip end part 41a which is crushed and extruded is remained within the space 44 and thus the burr or the extruded portion of the tip end part 41a does not contact with an inner face of the lens barrel 3 and a positional displacement of the lens holder 4 within the lens barrel 3 is prevented. Therefore, the width of the space 44 is set so that the burr or the extruded portion of the tip end part 41a does not contact with the inner face of the lens barrel 3 by assuming a crushed and extruded amount of the tip end part 41a when the tip end part 41a is crushed to make the boss part 41 as the distance determination part.

A pawl part 45 which is a rib made of resin is formed at six positions on the object side of the glass lens mounting part 40 and on an inner peripheral side with respect to the six boss parts 41. The pawl part 45 is used for fixing the fourth lens 24 to the lens holder 4 by thermal caulking. Since the pawl part 45 is a rib made of resin, the rib is deformed by thermal caulking and the fourth lens 24 can be fixed to the lens holder 4 without rattling. In accordance with an embodiment of the present invention, the number of the pawl parts 45 is not limited to three (3). The pawl parts 45 may be formed at equal intervals along the circumferential direction of the lens holder 4.

A protruded part 46 is formed on the face where the six boss parts 41 are formed. The protruded part 46 is formed on a face of the lens holder 4 which is located on an upper side when an assembling work of the lens holder 4 to the lens barrel 3 is to be performed. The protruded part 46 is utilized as a mark when a worker makes the lens holder 4 align with an appropriate posture with respect to the lens barrel 3. Since the protruded part 46 is formed, an assembling direction in the circumferential direction can be confirmed when the lens holder 4 is to be assembled into the lens barrel 3. Therefore, an assembling position in the circumferential direction when the lens holder 4 is to be assembled into the lens barrel 3 can be adjusted. In accordance with an embodiment of the present invention, the protruded part 46 may be formed in a recessed shape.

A second rib 49 extended in the optical axis "L" direction is formed on an inner peripheral face 48 of the glass lens mounting part 40 of the lens holder 4 at three positions between six pawl parts 45 in the circumferential direction. The second rib 49 is formed at three positions in the circumferential direction at equal intervals and is used for supporting and fixing the fourth lens 24 at three positions to the lens holder 4. The fourth lens 24 is supported and fixed by the second ribs 49 at three positions. Therefore, although when the entire peripheral face of the fourth lens 24 is fixed to the lens holder 4, a problem such as cracking or chipping of the lens holder 4 or of the fourth lens 24 may be occurred due to resin shrinkage of the lens holder 4 in a state that temperature is decreased. However, according to the abovementioned structure, the problem can be prevented. In accordance with an embodiment of the present invention, the number of the second ribs 49 is not limited to three (3). The second ribs 49 may be formed at equal intervals in the circumferential direction of the lens holder 4.

The lens holder 4 is formed with totaled six pawl parts 45, i.e., at two positions in each of three directions at equal intervals along the circumferential direction on an outer peripheral side of the glass lens mounting part 40. Further, the lens holder 4 is formed with the totaled six boss parts 41, i.e., at two positions in each of the three directions at equal intervals along the circumferential direction on an outer peripheral side of the pawl parts 45. Further, the second rib 49 is formed at three positions between two pawl parts 45 in the circumferential direction at equal intervals. Therefore, when the fourth lens 24 is to be fixed by the pawl parts 45 and the second ribs 49 and, when lengths of the boss parts 41 are to be adjusted, a pressing force applied to the lens holder 4 can be absorbed with a well-balanced manner and deformation of the lens holder 4 can be suppressed. Further, a variation when the fourth lens 24 is fixed to the lens holder 4 can be suppressed. Further, a variation when the lens holder 4 is assembled into the lens barrel 3 can be suppressed.

Figure 3:
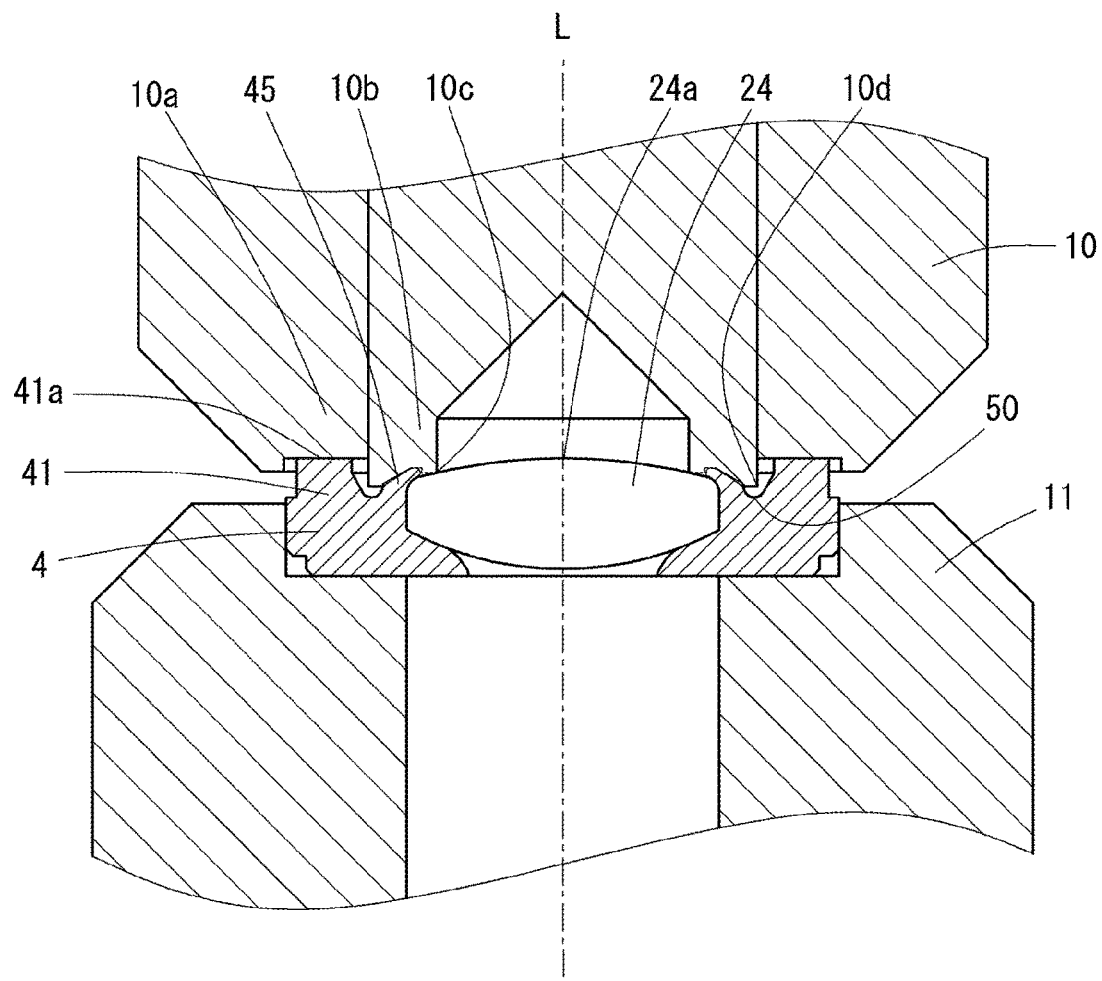
FIG. 3 is a partial enlarged view showing a heat press process.

The lens holder 4 is formed with a circular groove 50 on an outer peripheral part of the pawl parts 45. The circular groove 50 is formed so that an end part 10*d* of a caulking punch part 10 shown in FIG. 3 is entered into the circular groove 50 in a heat press process.

(Heat Press Process)

As shown in FIGS. 2A through 2C and FIG. 3, a heat press process is performed so that the lens holder 4 on which the fourth lens 24 is placed is placed on a caulking receiving part 11 and then the caulking punch part 10 is pressed against the lens holder 4. Further, the heat press process is performed as a preceding process of a process that the lens holder 4 is accommodated into the lens barrel 3.

In the heat press process, first, the fourth lens 24 is placed on the glass lens mounting part 40 of the lens holder 4 so as to be contacted and lightly press-fitted to the second ribs 49 formed at three positions on the inner peripheral face 48 shown in FIGS. 2A and 2B. Next, the lens holder 4 on which the fourth lens 24 is placed is placed on the caulking receiving part 11.

Next, a distance in the optical axis "L" direction from the reference surface to a surface apex 24*a* of the fourth lens 24 on the side where the six boss parts 41 are formed is measured. The reference surface is an opposite surface (the image side face of the lens holder 4) to the face where the six boss parts 41 are formed. In other words, a distance in the optical axis "L" direction between the reference surface and the surface apex 24*a* of a lens face on the object side of the fourth lens 24 is measured. Next, a crushing amount of the tip end part 41*a* of each of the six boss parts 41 is determined based on the measured distance. Since a crushing amount of each of the six boss parts 41 is determined with a surface position which is the surface apex 24*a* of the glass lens as a reference, an error of a thickness at the time of molding of the glass lens can be eliminated and trouble such as focus deviation due to an error of a thickness and the like at the time of molding of the glass lens is restrained. Therefore, the lens holder 4 on which the fourth lens 24 is placed can be appropriately manufactured.

Next, the tip end parts 10*a* and 10*b* of the caulking punch part 10 are heated and the tip end part 10*a* is pressed against the tip end parts 41*a* of the six boss parts 41 of the lens holder 4 so that the tip end parts 41*a* are crushed and thereby the lengths in the optical axis "L" direction of the six boss parts 41 are adjusted. In other words, the length in the optical axis "L" direction of the boss part 41 is determined so as to correspond to an error of the thickness at the time of molding of the glass lens, and the length in the optical axis "L" direction of the boss part 41 is adjusted by the caulking punch part 10 so as to obtain the determined distance which sets the boss part 41 to be the distance determination part. In this manner, when the length of the boss part 41 is adjusted, a space distance between the fourth lens 24 and another lens adjacent on a protruding direction side of the six boss parts 41, specifically, a space distance between the fourth lens 24 and the third lens 23 is set in an appropriate value which is capable of cancelling the error of the thickness of the glass lens.

Further, at the same time, the tip end part 10*b* is pressed against the pawl parts 45 of the lens holder 4 to crush the pawl parts 45 and the fourth lens 24 is fixed by thermal caulking. In this case, adjustment of the lengths in the optical axis "L" direction of the six boss parts 41 and the thermal caulking to the pawl parts 45 are performed simultaneously. Therefore, fixing of the fourth lens 24 to the lens holder 4 and adjustment of the space distance between the fourth lens 24 and the adjacent lens which is adjacent to the surface where the six boss parts 41 of the lens holder 4 are formed can be performed simultaneously. Further, in comparison with a heat press process in which adjustment of the lengths in the optical axis "L" direction of the six boss parts 41 and the thermal caulking to the pawl parts 45 are separately performed, the heat press process can be simplified.

Further, the edge part 10*c* of the caulking punch part 10 is contacted with an outer peripheral portion of a lens face on the object side which is a lens face on one side of the fourth lens 24. In this case, it may be structured that the six boss parts 41 of the lens holder 4 are crushed with a position in the optical axis "L" direction of the surface of the fourth lens 24 where the edge part 10*c* is contacted as a reference. The surface is the lens face on the one side (the object side). Further, the end part 10*d* of the caulking punch part 10 is entered into the circular groove 50 formed in the lens holder 4 and the fourth lens 24 is fixed by the pawl parts 45 by using thermal caulking.

In the heat press process, the tip end parts 41*a* of the six boss parts 41 are heated and crushed to adjust the lengths in the optical axis "L" direction of the six boss parts 41 and thereby the space distance between the fourth lens 24 and the third lens 23 which is the one side lens is determined. Therefore, the lens unit 1 in accordance with an embodiment of the present invention can be manufactured in a state that trouble such as focus deviation due to a molding error and the like of the fourth lens 24 is restrained.

Further, after the fourth lens 24 has been assembled to the lens holder 4 by the heat press process, the lens holder 4 is accommodated into the lens barrel 3. Therefore, variation of an assembling dimension error of the fourth lens 24 assembled to the lens holder 4 can be suppressed.

Further, since the lens holder 4 is made of resin, molding is easily performed and, in addition, the stress applied to the fourth lens 24 by the heat press process can be absorbed by the resin and thus damage, deformation, distortion and the like of the fourth lens 24 can be suppressed. Further, since the six boss parts 41 are made of resin, the tip end parts 41*a* can be surely deformed and crushed by the heat press process.

In the heat press process described above, the adjustment of the lengths in the optical axis "L" direction of the six boss parts 41 and the thermal caulking to the pawl parts 45 are performed simultaneously. However, it may be structured that adjustment of the lengths in the optical axis "L" direction of the six boss parts 41 and thermal caulking to the pawl parts 45 are performed separately.

Although the present invention has been shown and described with reference to a specific embodiment, various changes and modifications will be apparent to those skilled in the art from the teachings herein. For example, the six boss parts 41 are formed on an object side face of the lens holder 4. However, the six boss parts 41 may be formed on an image side face of the lens holder 4. In this case, the boss parts 41 and the pawl parts 45 are formed on an image side face of the lens holder 4 and the reference surface and the gate parts 43 are disposed on an object side face of the lens holder 4. Also in this case, trouble such as focus deviation due to a molding error and the like of a glass lens can be restrained similarly to the case that the boss parts 41 are formed on the object side face of the lens holder 4.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens unit, comprising:
    a plurality of lenses which are arranged in an optical axis direction, the plurality of lenses comprising at least a glass lens; and
    a lens barrel which holds the plurality of lenses, the lens barrel comprising a glass lens holding part which holds the glass lens;
    wherein the glass lens holding part is a lens holder made of resin which is separately provided from the lens barrel and is accommodated into the lens barrel together with the glass lens;
    wherein when a face of the lens holder which is on an object side in the optical axis direction is referred to as an object side face and another face of the lens holder which is on an image side is referred to as an image side face, the object side face or the image side face is formed with a plurality of projecting parts which support an adjacent lens which is adjacent to the glass lens on one side;
    wherein the plurality of projecting parts is structured as a distance determination part which adjusts and determines a space distance between the glass lens and the adjacent lens;
    wherein the distance determination part which is the projecting that a tip end part of the projecting part is heated and crushed to adjust a length of the projecting part in the optical axis direction, and
    wherein a space is provided between forming positions of the projecting parts and an outer peripheral face of the lens holder in a radial direction of the lens holder for preventing a crushed and protruded portion of the tip end part of the projecting part from contacting with an inner face of the lens barrel.

2. The lens unit according to claim 1, wherein
    the object side face or the image side face of the lens holder is formed with a plurality of groove parts each of which is continuously formed from an outer peripheral face of the lens holder to an outer peripheral face of the glass lens, and
    the groove parts are formed at equal intervals in a circumferential direction of the lens holder.

3. The lens unit according to claim 1, wherein
    a face of the lens holder on an opposite side to a face where the projecting parts are formed is formed with a gate part which is a recessed part in which an injection-molded gate mark is left, and
    the plurality of projecting parts and the gate part are disposed at different positions in a circumferential direction of the lens holder.

4. The lens unit according to claim 1, wherein
    the distance determination part adjusts the space distance between the glass lens and the adjacent lens, so as to restrain focus deviation based on a thickness error of the glass lens.

5. The lens unit according to claim 4, wherein
    a face of the lens holder on an opposite side to a face where that the projecting parts are formed is a reference surface structured to measure a height of a lens surface apex of the glass lens which is fixed to the lens holder, and
    a height of the distance determination part from the reference surface is determined based on the height of the lens surface apex from the reference surface.

6. The lens unit according to claim 1, further comprising:
    a diaphragm which is accommodated into the lens barrel, wherein the glass lens is disposed at a position adjacent to the diaphragm.

7. The lens unit according to claim 1, wherein
    the lens holder comprises a pawl part which is a rib made of resin structured to fix the glass lens by thermal caulking.

8. The lens unit according to claim 1, wherein
    the object side face of the lens holder is formed with a protruded part or a recessed part which is a mark used to set the lens holder in an appropriate posture with respect to the lens barrel.

9. The lens unit according to claim 1, wherein
    the plurality of projecting parts is formed on the object side face of the lens holder.

10. A manufacturing method for a lens unit, the lens unit comprising:
    a plurality of lenses which are arranged in an optical axis direction, the plurality of lenses comprising at least a glass lens; and
    a lens barrel which holds the plurality of lenses, the lens barrel comprising a glass lens holding part which holds the glass lens;
    wherein the glass lens holding part is a lens holder made of resin which is separately provided from the lens barrel and is accommodated into the lens barrel together with the glass lens;
    wherein when a face of the lens holder which is on an object side in the optical axis direction is referred to as an object side face and another face of the lens holder which is on an image side is referred to as an image side face, the object side face or the image side face is formed with a plurality of projecting parts which support an adjacent lens which is adjacent to the glass lens on one side;
    wherein the plurality of projecting parts is structured as a distance determination part which adjusts and determines a space distance between the glass lens and the adjacent lens;
    wherein the distance determination part which is the projecting part is formed so that a tip end part of the projecting part is heated and crushed to adjust a length of the projecting part in the optical axis direction, and wherein a space is provided between forming positions of the projecting parts and an outer peripheral face of the lens holder in a radial direction of the lens holder for preventing a crushed and protruded portion of the tip end part of the projecting part from contacting with an inner face of the lens barrel, the manufacturing method comprising:
a heat press process in which tip end parts of the plurality of projecting parts are heated and crushed, so that a length in the optical axis direction of the plurality of projecting parts is adjusted and thereby a length of the distance determination part is determined.

11. The manufacturing method for a lens unit according to claim 10, wherein
the heat press process is performed before the lens holder is accommodated into the lens barrel.

12. The manufacturing method for a lens unit according to claim 10, wherein
in the heat press process, a crushing amount of the plurality of projecting parts is determined with a lens face of the glass lens as a reference.

13. The manufacturing method for a lens unit according to claim 10, wherein
the glass lens holding part comprises a pawl part which is a rib made of resin structured to fix the glass lens by a thermal caulking, and
in the heat press process, adjustment of the length in the optical axis direction of the plurality of projecting parts and the thermal caulking of the pawl part are performed simultaneously.

14. The manufacturing method for a lens unit according to claim 11, wherein
a face of the lens holder on an opposite side to a face where the projecting parts are formed is a reference surface structured to set the length in the optical axis direction of the projecting part as the distance determination part,
a height of a lens surface apex of the glass lens is measured from the reference surface when the glass lens is mounted on a glass lens mounting part of the lens holder, and
after that, a crushing amount of the tip end part of the projecting part which is heated and crushed is determined based on the height of the lens surface apex from the reference surface, and then the heat press process is performed.

15. The manufacturing method for a lens unit according to claim 14, wherein
the glass lens is mounted on the glass lens mounting part of the lens holder and then the heat press process is performed, and
after that, the lens holder is accommodated into the lens barrel and then, the adjacent lens is accommodated into the lens barrel.

16. The manufacturing method for a lens unit according to claim 14, wherein
the lens holder comprises a pawl part which is a rib made of resin structured to fix the glass lens by a thermal caulking, and
in the heat press process, adjustment of the length in the optical axis direction of the plurality of projecting parts and the thermal caulking of the pawl part are performed simultaneously.

17. The lens unit according to claim 2, wherein
a face of the lens holder on an opposite side to a face where the projecting parts are formed is formed with a gate part which is a recessed part in which an injection-molded gate mark is left, and
the plurality of projecting parts and the gate part are disposed at different positions in a circumferential direction of the lens holder.

18. The lens unit according to claim 3, wherein
the distance determination part adjusts the space distance between the glass lens and the adjacent lens, so as to restrain focus deviation based on a thickness error of the glass lens.

19. The lens unit according to claim 18, wherein
a face of the lens holder on an opposite side to a face where that the projecting parts are formed is a reference surface structured to measure a height of a lens surface apex of the glass lens which is fixed to the lens holder, and
a height of the distance determination part from the reference surface is determined based on the height of the lens surface apex from the reference surface.

20. The lens unit according to claim 7, wherein
the distance determination part adjusts the space distance between the glass lens and the adjacent lens, so as to restrain focus deviation based on a thickness error of the glass lens.

* * * * *